(12) United States Patent
Zhong

(10) Patent No.: US 12,389,837 B1
(45) Date of Patent: Aug. 19, 2025

(54) HUMIDITY CONTROL APPARATUS AND MATERIALS

(71) Applicant: University of South Florida, Tampa, FL (US)

(72) Inventor: Ying Zhong, Tampa, FL (US)

(73) Assignee: University of South Florida, Tampa, FL (US)

( * ) Notice: Subject to any disclaimer, the term of this patent is extended or adjusted under 35 U.S.C. 154(b) by 391 days.

(21) Appl. No.: 18/121,033

(22) Filed: Mar. 14, 2023

(51) Int. Cl.
*A01G 9/24* (2006.01)
*B32B 27/08* (2006.01)
*B32B 27/30* (2006.01)

(52) U.S. Cl.
CPC .............. *A01G 9/242* (2013.01); *B32B 27/08* (2013.01); *B32B 27/308* (2013.01); *B32B 2250/24* (2013.01); *B32B 2307/50* (2013.01); *B32B 2307/7244* (2013.01)

(58) Field of Classification Search
CPC ................................ A01G 9/242; B32B 27/08
See application file for complete search history.

(56) References Cited

U.S. PATENT DOCUMENTS

| | | | | |
|---|---|---|---|---|
| 3,520,949 A * | 7/1970 | Shepherd | ................. | A23L 27/74 521/64 |
| 4,916,642 A * | 4/1990 | Kaiser | ................. | G05D 23/1905 700/278 |
| 6,592,995 B2 * | 7/2003 | Topolkaraev | ........... | A61L 15/22 428/478.2 |
| 9,932,445 B2 * | 4/2018 | Tan | ..................... | C08G 73/1042 |
| 10,278,338 B2 * | 5/2019 | Houweling | ............ | A01G 9/246 |
| 10,990,076 B2 * | 4/2021 | Oliveira | ............... | G05B 19/406 |
| 11,412,668 B2 * | 8/2022 | Houweling | ............. | A01G 9/24 |
| 2016/0121546 A1 * | 5/2016 | Yao | ....................... | B29C 64/106 428/221 |

OTHER PUBLICATIONS

Kim et al., Human-Skin-Inspired Adaptive Smart Textiles Capable of Amplified Latent Heat Transfer for Thermal Comfort, Advanced Intelligent Systems, 2020, pp. 1-9.

* cited by examiner

*Primary Examiner* — Freddie Kirkland, III
(74) *Attorney, Agent, or Firm* — Anton J. Hopen; Smith & Hopen, P. A.

(57) ABSTRACT

A ventilation port maintains the humidity range within a sealed or partially sealed enclosure maintaining a level of atmospheric moisture such as a greenhouse. The port is comprised of a polymer blend film made of a hydrophilic component serving as the water-absorbing material and substrate component serving as the mechanical backbone. The film is designed to bend and open the port when the humidity within the enclosure exceeds a predetermined level outside the humidity range, allowing for the venting of excess humidity. Once the humidity falls back within the desired range, the film returns to its original state and closes the port. A humidity sensing device is also disclosed including the film with a piezoresistive material layer, electrodes in electrical communication with the layer, and an electrical measurement device to measure resistivity or capacitance. The strain of the layer due to changes in humidity results in changes in its electrical properties, allowing the device to indicate corresponding humidity levels.

19 Claims, 19 Drawing Sheets
(18 of 19 Drawing Sheet(s) Filed in Color)

HUMIDITY CONTROL APPARATUS AND MATERIALS

BACKGROUND OF THE INVENTION

1. Field of the Invention

The described embodiments relate generally to humidity-reactive materials, compositions and apparatuses. Specifically, the described embodiments relate to systems and methods for using a humidity-reactive polymer blend film to automatically modulate the ventilation in a greenhouse environment.

2. Brief Description of the Related Art

Today, there are over 45 million people still suffering from famine or famine-like conditions, with children and women hit the hardest. Food crisis has been further aggravated by the on-going pandemic, conflicts, climate change, shrinking area of arable land, and economic instability. More energy and cost-efficient solutions are urgently needed to promote the yield from farmlands.

Because of the precisely controlled climate, increased production, minimized production risk, decreased disease and pests, year-round growing time, and increased stability and security, greenhouse farming has been broadly used and growing rapidly for years. Based on the 2017 U.S. Census of Agriculture, the market value of nursery and greenhouse crops was as much as $194 billion, reaching 49.8% of the total market value of agricultural products while using only 10% of the cultivated land. The global commercial greenhouse market size is estimated to value at $61.6 billion by 2027.

With the transparent glass or plastic shields, the greenhouses shield the plants from the external climate and permits lights in, creating their own microclimate with controllable temperature and humidity. These functions allow the growth of desired crops, increase production, improve food quality, minimize water consumption, and reduce their ecological footprint. Thus, climate management, especially humidity and temperature regulation in the greenhouses is the key to achieve above goals.

For relative humidity (RH), the transpiration of the plants significantly decreases with the increase of RH, reducing the efficiency for nutrients uptake and productivity. Warm air has a higher moisture-holding capacity than cooler air. The transpiration during daytime will leave more moistures in the air. When the temperature drops down to the dew point during nighttime, condensation occurs, forming water droplets on leaves and glazing. The drips will promote the germination and spread of fungal pathogen spores such as *Botrytis* and powdery mildew, leading to a largescale outbreak of diseases and death of leaves or plants. They also wet plant surfaces and spread plant pathogens from plant to plant by splashing soil and plant debris. In addition, high humidity interferes plant transpiration, impacting the yield; water puddles on the floor can lead to algae growth, faster breeding of insects, safety risks for the workers; the condensation on the ceilings and walls can reflect light, influencing the photosynthesis process for plant growth. Thus, it is critical to maintain low RH in the greenhouses.

However, moisture is continuously generated from the transpiration. It has always been a challenging topic to reduce humidity in a high-efficiency and low-cost manner. The current solutions include both cultural practices such as precise watering, adequate place spacing, weed controlling, and passive and active ways for humidity control. Ventilation is the major passive method for dehumidification, it replaces the high-humid inside air with the low-humid outside air when the external RH is below 85%. But this process is mostly controlled by humans through monitoring the humidity level consistently and opening and closing the glazing manually, facing problems of time consuming, labor intensive, and operator dependent. Active ways for humidity control includes heat pump, desiccants, and heat exchangers. Heat pumps has been reported effective as it condenses the moisture in the air with evaporator coils. However, it costs nearly 64% of the initial capital of equipment for the greenhouse. Solar-assisted liquid desiccants have been reported effective in dehumidification and temperature reduction for 5 to 7.5° C. However, its use is limited to areas with abundance solar radiation. The heating and venting system added to increase the dew point and replace high humid air is very energy-intensive, costing 0.7 kWh of energy per meter square.

It typically costs about 20% of a greenhouse's energy bill. If we can find a way which can help reduce this bill, billions of farmers will benefit from the increased greenhouse farming profits; we will also reduce the energy consumption by agriculture which is as much as 1,872 trillion Btu for the U.S. per year. In recent years, new technologies including smart greenhouse covers and Internet of Things (IoT) have been developed to enable energy-independent, labor independent, and high-yield greenhouses. Major efforts have been devoted on the intelligent photovoltaic (PV) systems which regulate solar radiation, generate energy and control temperature. Smart material enable humidity control is still a less explored field in greenhouse climate regulation.

Another aspect is the global wide plastic pollutions caused by the massive use of greenhouse covers. Polyethylene (PE), polycarbonate (PC), and Polyvinyl Chloride (PVC) are the mostly used greenhouse covers. With the growing of the greenhouse cover market to over $11.5 billion in 2021, over 3 million tons of non-biodegradable agricultural plastic wastes are being produced each year. Their degradation takes hundreds of years, which is a huge threaten for the environment. Therefore, biodegradable greenhouse covers need to be developed. They need to be durable and strong enough to serve as high quality shields during the required serving time, but also biodegradable within one or two years after use.

BRIEF SUMMARY OF THE INVENTION

The present invention includes a new low-cost all-in-one solution based on humidity sensitive polyethylene glycol (PEG)/cellulose acetate (CA) blended humidity sensitive films which can be used as the biodegradable smart glazing materials of greenhouses to adjust the humidity and temperature of the greenhouses through automatically opening the glazing for air circulation (the passive path), as well as humidity sensors which can monitor the moisture level in the greenhouse to turn on the ventilating system for accelerating the circulation to form a closed loop active path for climate control.

A ventilation port and humidity sensor for a greenhouse is disclosed individually or may be deployed in combination. More broadly, the materials and sensors disclosed herein are applicable to any sealed or partially sealed enclosure maintaining a level of atmospheric moisture (water vapor). The ventilation port is made of a polymer blend film of a hydrophilic material such as polyethylene glycol (PEG) and substrate material such as cellulose acetate (CA) with PEG serving as a water-absorbing material and CA serving as a mechanical backbone. Alternatively, additional materials may be employed. For example, polyvinyl alcohol (PVA), starch, cellulose, poly acrylic acid, polyacrylonitrile, poly (N-isopropylacrylamide) (PNIPAM) and other hydrogels may serve as the water-absorbing component. Likewise, other materials may serve as the structural supporting component such as polyimide, polystyrene, poly(methyl methacrylate) (PMMA), polycarbonate and the like. The film bends to open the port and vent excess humidity when the humidity in the greenhouse exceeds a predetermined level and returns to its original state to close the port when the humidity falls back within the range. The thickness of the polymer blend film is between 20 to 150 µm and between 20 to 150 µm for maximum performance. However, some utility is available within the range of 10 to 2000 µm. The ratio of PEG to CA for the PEG/CA blend is less than or equal to 20% of the total weight of the film. The thickness ratio of the PET:CA double layer ideally is between 1:1 and 1:2 but broader ratios will still find utility in commercial embodiments.

A humidity sensor includes a polymer blend film of PEG and CA with a layer of piezoresistive material such as graphene electrostatically printed on it. The PEG may be exchanged with a number of hydrophilic materials that absorb water vapor. However, additional depositing methods may include screen printing, flexography, gravure printing, soft lithography, laser direct writing, inkjet printing and aerosol jet printing. Furthermore, materials other than graphene may be used that change resistance responsive to deformation. These include but are not limited to carbon nanotubes, metal nanowires/nanoparticles, graphite, liquid metal and the like. Electrodes are affixed in galvanic communication with the graphene and an ohmmeter or capacitance meter (e.g., electrical devices) that retrieve a resistivity or capacitance measurement respectively. When graphene or a similar piezoresistive material is subjected to strain or deformation, changes in its electrical conductivity or capacitance may occur.

The resistivity or capacitance measurement is correlated to humidity values and reported by the sensor. The film may have a substantially vapor resistant protection layer such as polydimethylsiloxane (PDMS) approximately 300 µm-thick (but may range from nearly 0 to 500 µm) coated on one side and the graphene may be binder-free and optionally sandwiched between the film and the protection layer. Materials other than PDMS may be used such as poly(methyl methacrylate) (PMMA), polycarbonate (PC), polypropylene (PP) or any adhesive material. The film may be pre-deformed to increase the resistivity measurement as humidity increases. The sensor also has a controller that activates a exhaust mechanism such as a ventilation fan to exhaust humidity based on the resistivity or capacitance measurement exceeding a threshold or by adjusting the exhaust mechanism's throughput (e.g., fan revolutions per minute) based on the resistivity or capacitance range.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which.

DETAILED DESCRIPTION OF THE PREFERRED EMBODIMENT

Material Sourcing

Polyethylene glycol (PEG) (average Mn 20,000), cellulose acetate (average Mn 50,000), acetone absolute (>99.9%), and ethanol absolute (>99.9%) were all purchased from SIGMA-ALDRICH. Graphene was purchased from TECHINSTRO, INC. Medical polyurethane (PU) adhesive films were purchased from NITTO DENKO, INC. The SLYGARD 184 silicone elastomer kit was obtained from DOW CORNING, INC. NAFION films for comparison purpose were purchased from FUELCELLSTORE, US.

Methods.

Figure 1A:
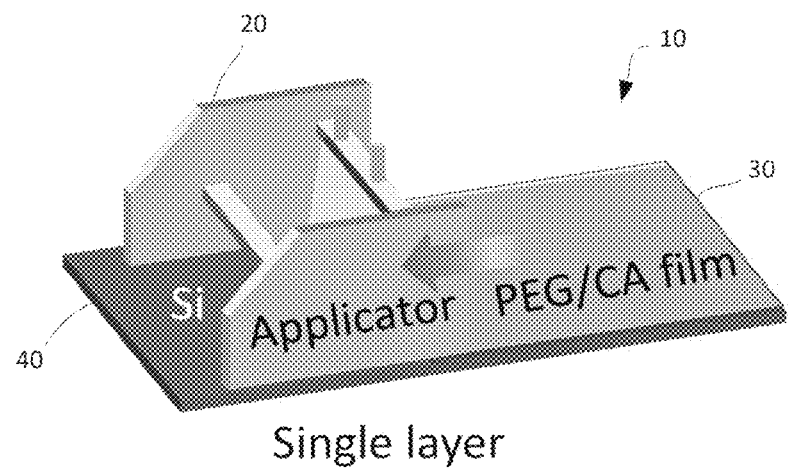
FIG. 1a is an isometric view of a blade coating of single-layer PEG/CA blend film.
Figure 1B:
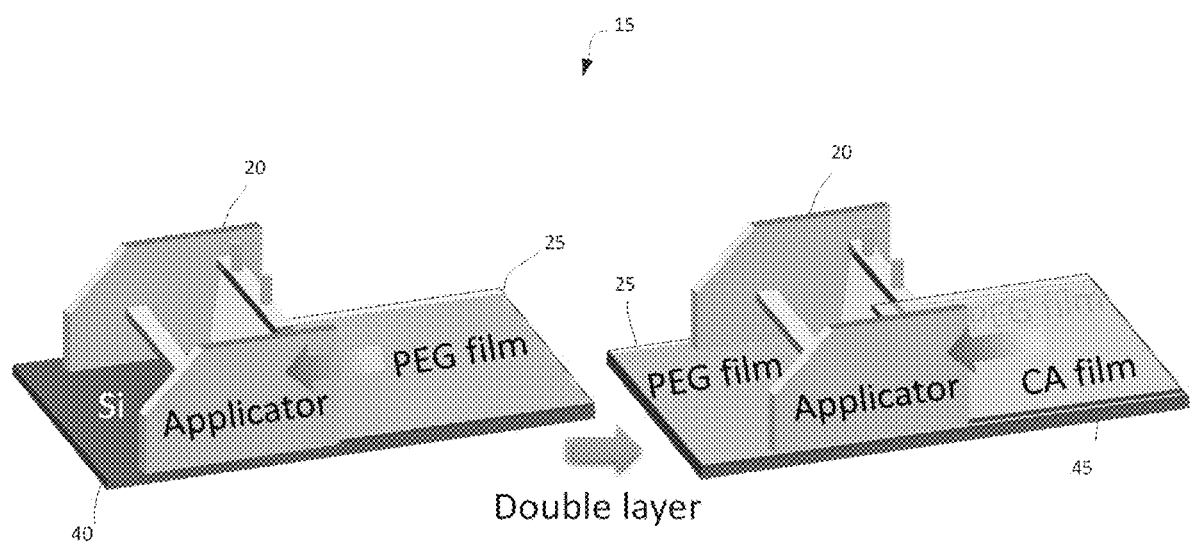
FIG. 1b is an isometric view of a blade coating of double-layer film made by PEG and CA layer.

CA was dissolved in acetone at the weight ratio of 15%, and PEG was dissolved in the mix of ethanol and water (4:3 in volume) at weight ratio of 33%. To manufacture the uniform single-layer PEG/CA blend film, the PEG and CA solutions were mixed at different PEG ratios ranging from 5 wt. % to 25 wt. %. As shown in FIG. 1a, a film applicator 20 was utilized to realize blade coating 30 of the blended solution on silicon wafers 40 at different thicknesses. The tested films thicknesses include 20 μm, 40 μm, 60 μm, 100 μm, and 150 μm. A suspended glass cover was applied on the blade coated film to reduce the evaporation rate and protect the drying procedure at room temperature for 6 hours. A razor was used to cut around the edges of the film and to peel it off from the silicon substrate. In addition to the single-layer blended film, we also manufactured PEG/CA double layer film 15 by blade coating PEG first 25 and then coat the CA layer 45 after the PEG layer is dried (FIG. 1b). Different thickness ratios between PEG and CA layers were tested, including 1:1, 1:2, 1:3, 1:4, 3:1, and 4:1.

Humidity activated bending behavior of the PEG/CA film.

Figure 1C:
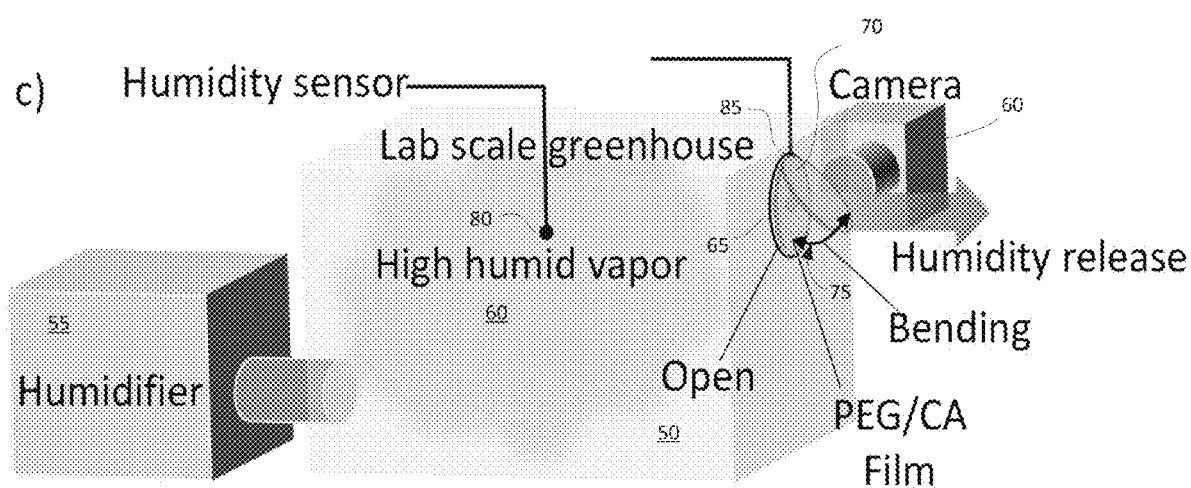
FIG. 1c is an isometric view of a humidity chamber setup to evaluate the bending behavior of the PEG/CA film and its capability to reduce the humidity in a lab scale greenhouse.

As schematized in FIG. 1c, a humidity controllable system was set up by connecting an acrylic chamber 50 (52 inches long and 16×16 inches cross-sectional area) to a humidifier 55 which releases controllable amount of humid mist 60 into the chamber from an opening 65 at the upper surface of the chamber 50. There is a round shape opening of 4-inch diameter at the opposite end. This way, the non-uniform humid atmosphere 60 provided by the humidifier 55 can obtain some buffering time to become more uniform until it reaches the opening 65 at the opposite end. The humidity coming out from the opening 65 can be more uniform and controllable. The PEG/CA films 70 were hung 1 inch away from the opening. The RH was monitored with a humidity sensor 85 (SENSIRION SEK-SHT40-AD1B) attached near the film. For the cycling test, the opening 65 was firstly closed, after the humidity inside of the chamber became uniform, the cover on the opening was removed and the specimen was exposed to the humidity for 15 s. After which, the opening was closed for 30 s. The cycling was repeated for at least 10 times. During the process, the behavior of the films was captured 60 by images and videos, and then analyzed using MATLAB to evaluate the behavior of the PEG/CA films upon humidity variation.

Bending Angle Monitoring Through Video Processing with MATLAB

Figures 1D, 1E, 1F, 1G, 1H:
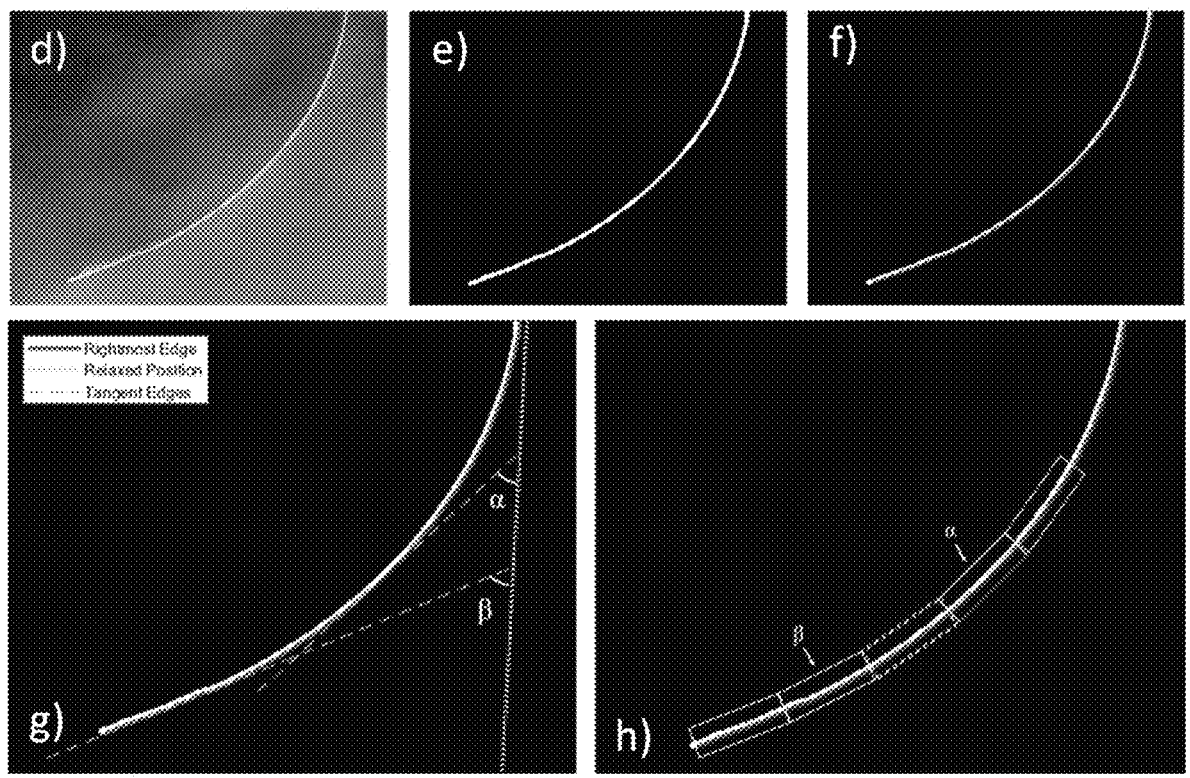
FIG. 1d is an image of the PEG/CA film bending at high humidity.
FIG. 1e is an image of the PEG/CA film bending at high humidity after image processing.
FIG. 1f is an image of the PEG/CA film bending at high humidity with boundary tracing along the film.
FIG. 1g is an image of the PEG/CA film bending at high humidity with tangent vectors to calculate the angle of bending.
FIG. 1h is an image of the PEG/CA film bending at high humidity with boundary tracing along the film and dividing the film into small sections.

MATLAB code was developed to process the images and videos. The video frame was first cropped to include just the region of interest, leaving an image of the film only (FIG. 1d). Then we enhanced the edges of the film to make it more detectable with the fiber-matrix filter. Additional processing techniques were used to smoothen the edges of the film and binarize the image, making the film white and the background black (FIG. 1e). Finally, a boundary tracing function was applied on the specimen's rightmost boundaries to neglect any torsion that might happen in the specimen (FIG. 1f).

To quantify the deflection of the specimens, the algorithm used the dot product between a reference vector (yellow dotted line in FIG. 1g) and tangent vectors to the edge of the specimen to calculate the angle of bending. The reference vector is the first vector established by the algorithm and is the initial position of the specimen before bending. We then divided the boundary into small sections (FIG. 1h). The tangent vector of each section was measured versus the reference vector to calculate the angle at each section. This procedure was conducted for each frame in the video and the angle of bending for each section of the boundary sections was recorded.

PEG/CA Films for Passive Humidity Adjusting of Greenhouses.

The humidity control chamber in FIG. 1c can also serve for the purpose of mimicking the greenhouse. Its humidity is provided by the humidifier. To evaluate the capability PEG/CA film for adjusting the inside RH of the greenhouse. A round shape 50 μm-thick PEG/CA film with diameter of 4 inch was attached onto the outside of the opening, covering it up entirely. The SENSIRION humidity sensors were attached at the center of the opening, as well as the location 6 inch away from it in the chamber but at the same height. By comparing the data from these two humidity sensors, we can compare the humidity at the area with and without the smart cover. The humidifier was turned on for 30 s and then switched off for 5 mins. Up to 7 cycles were performed.

Manufacturing of the PEG/CA Humidity Sensor.

The previously reported corona discharge enabled electrostatic printing (CEP) technology was used to manufacture the PEG/CA humidity sensor by utilizing the PEG/CA film as the substrate which can interact with humidity, and CEP printed graphene network to detect the strain in the film and reflect the humidity change. As sketched in FIG. 1i, The PEG/CA film was first cut into size of 2.0"×0.5". Then a 300 μm-thick layer of polydimethylsiloxane (PDMS) was coated on one side of the film. The non-coated side was attached to the bottom of the polystyrene petri dish cap 95. Dry graphene powers were placed in the petri dish. After closing the cap, corona 90 (20 kV, 0.01 mA) was applied on the top of the petri dish 95. Because of electrostatic force, graphene will be attracted to the PEG/CA film 100 within 200 ms and attached onto it. Then conductive threads were attached to function as electrodes 105. Finally, the NITTO PU film was attached onto the printed graphene as the protection layer.

PEG/CA Humidity Sensor Enabled Active Greenhouse Humidity Monitoring and Regulation.

The CEP printed PEG/CA humidity sensor was tested by exposing the sensor at different levels of humidity. A multimeter (AGILENT 34401A DMM) was utilized to monitor the resistivity changes in the sensor during the humidity cycles, following the same humidifying cycling process with the PEG/CA film evaluation. The data was compared with the humidity measured by the SENSIRION sensor. To actively regulate the humidity with the CEP PEG/CA humidity sensor, it was connected to an ARDUINO UNO board along with a DC motor fan (12 V, 6000 RPMs) which can accelerate the ventilation of the greenhouse. The ARDU- INO'S microcontroller is programmed to act as an ohmmeter that measures the resistivity of the humidity sensor and compares it to a certain threshold. If the threshold of the sensor's resistivity was reached, the fan can be turned on. Then the humidity with and without the fan will be compared to evaluate the effectiveness of the CEP PEG/CA sensor for active closed-loop humidity regulation for the greenhouse.

Volume Expansion Behavior Evaluation of PEG/CA Films.

Due to the small dimensions and fast recovery of the films, it was impractical to measure the volume expansion using conventional measurements. Instead, we measured the film's mass difference to represent the volume difference of the films. The following equation was used to detect the volume expansion of the films, $$V\% = \frac{\Delta V}{V_o} = \frac{V_f - V_o}{V_o} = \frac{(m_f - m_o)/\rho}{L \times W \times t}$$

where V denotes volume, m denotes mass, ρ denotes density of water. And L, W, and t denote the length, width, and thickness of the film, respectively. Each film was weighed to get an initial weight $m_o$. Then it was fully immersed into a container filled with deionized water for 15 seconds. After the immersion process, the film was quickly transferred to balance to measure the final weight $m_f$.

COMSOL Simulation of the PEG/CA Film Reaction to Humidity.

The model was simulated using COMSOL MULTIPHYSICS software and was constrained in a similar manner to its physical counterpart, fixed at one end and free at the rest of its boundaries. A load was applied using the hygroscopic swelling library. Hygroscopic swelling was governed by the equation ε=β×ΔC, where ΔC is the mass concentration gradient (the mass in this study is water vapor) and ẞ is the coefficient of hygroscopic swelling which is optimized by running the simulation with different β values until we get the same bending angle results as the angles extracted by the MATLAB algorithm.

Humidity Induced Bending Behavior of the PEG/CA Films.

Figure 2A:
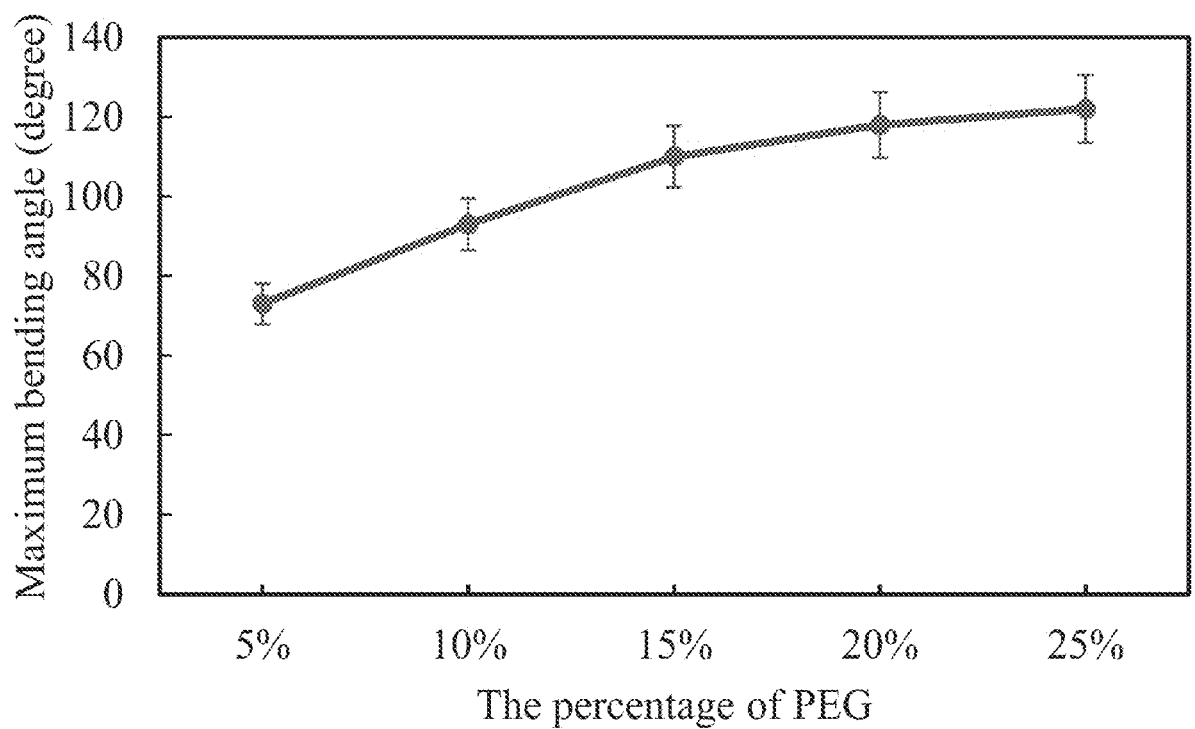
FIG. 2a is a graph showing the relationship between the PEG ratio and the maximum bending angle.

As tested in FIG. 2a, because PEG is the water absorption component in the PEG/CA film, more PEG can lead to stronger hygroscopic swelling performance. However, when the PEG ratio was over 20 wt. %, the films were no longer transparent. The stiffness of the films also reduces. Therefore, the recommended PEG blending ratio is lower than 20 wt. %.

Figure 2B:
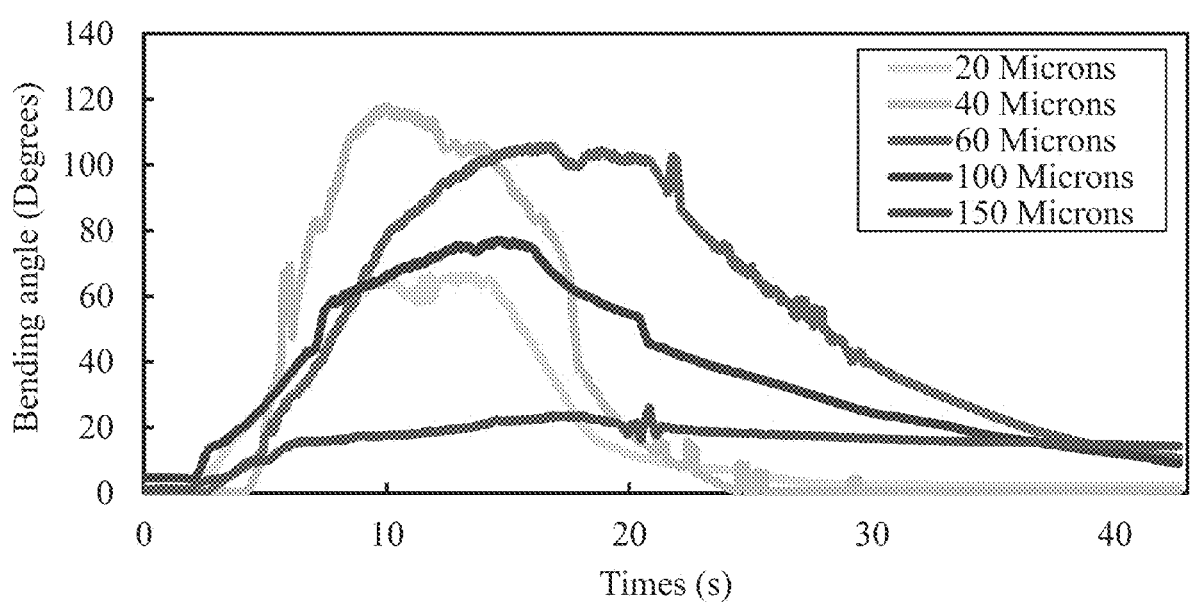
FIG. 2b is a graph showing the plotted bending angle change with time of PEG/CA films with different thicknesses.
Figure 2C:
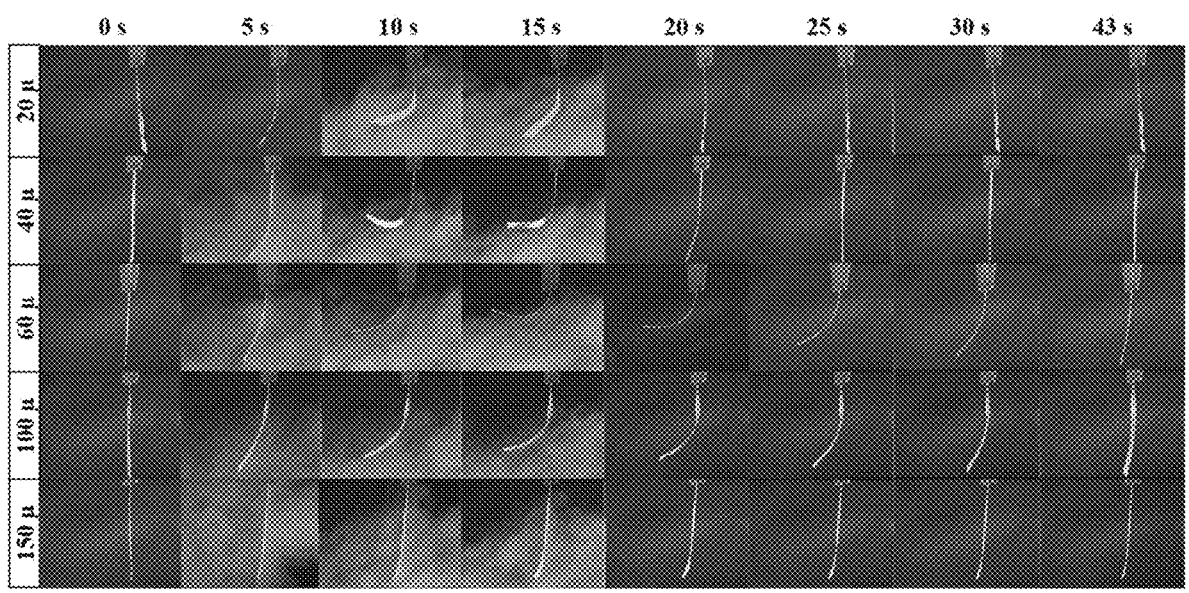
FIG. 2c are optical images at different times for PEG/CA films with different thicknesses.

The PEG/CA film thickness also impacts its bending behavior significantly. From FIGS. 2b and 2c, it can be learnt that when the film is as thin as 20 μm, the maximum bending angle can reach 66°. However, because of the small thickness, the film itself can get twisted easily and the bending behavior is not stable. When the film thickness is 40 μm, it can rapidly reach bending angle of 70° within as short as 6 s, and as large as 118° within 9 s. More interestingly, it can quickly recover to the original straight status within 10 s. For the 60 μm PEG/CA films, they can reach bending angle as high as 110° within 10 s, and recover after 25 s. The 100 μm film's maximum bending angle reached 77°, which is also very effective. However, when the film thickness reaches 150 μm, the maximum bending angle is less than 30°. Therefore, it can be concluded that the bending motion was suppressed with increasing the thickness of the film. The recommended PEG/CA film thickness is between 40 μm to 100 μm to guarantee rapid, stable, and sufficient bending behavior and effective recovery within a short time.

Figure 3:
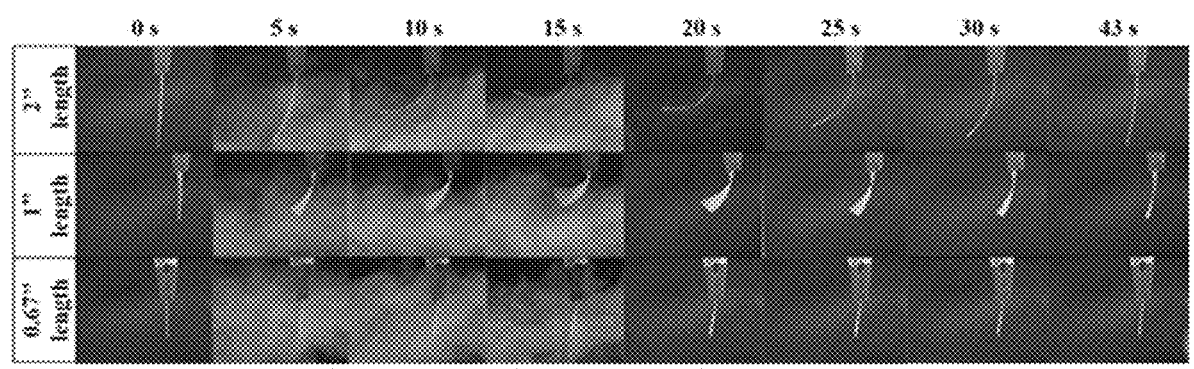
FIG. 3 shows a series of images of the bending motion of single layer 60 µm-thick PEG/CA films with different lengths of 2", 1", and 0.67".

The impact of specimen length on the bending behavior was also examined using 60 μm-thick single-layer PEG/CA films. As shown in FIG. 3, the bending motion is more extreme with increasing the length of the film. The maximum bending angle of the full-length 2" film was as much as 110°; while the length reduces to half of it, the bending motion reached a maximum of 96°; when the length reduces to 0.67", the maximum bending angle reduced extremely to as low as 10°. This can also be an important specification in designing PEG/CA films to act as the gates of the greenhouse's orifices, as bigger area means more opening, and thus faster control of humidity.

Reversible Humidity Induced Bending Behavior of the Single Layer PEG/CA Films.

Figure 4A:
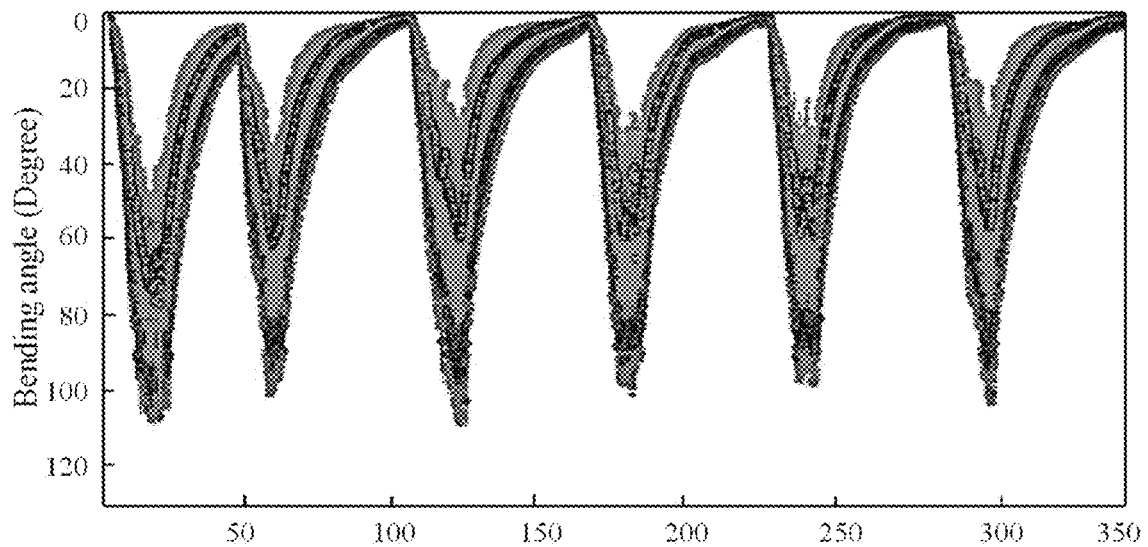
FIG. 4a is a MATLAB analyzed bending angle plot of 60 µm-thick films at different regions on the film.
Figure 4B:
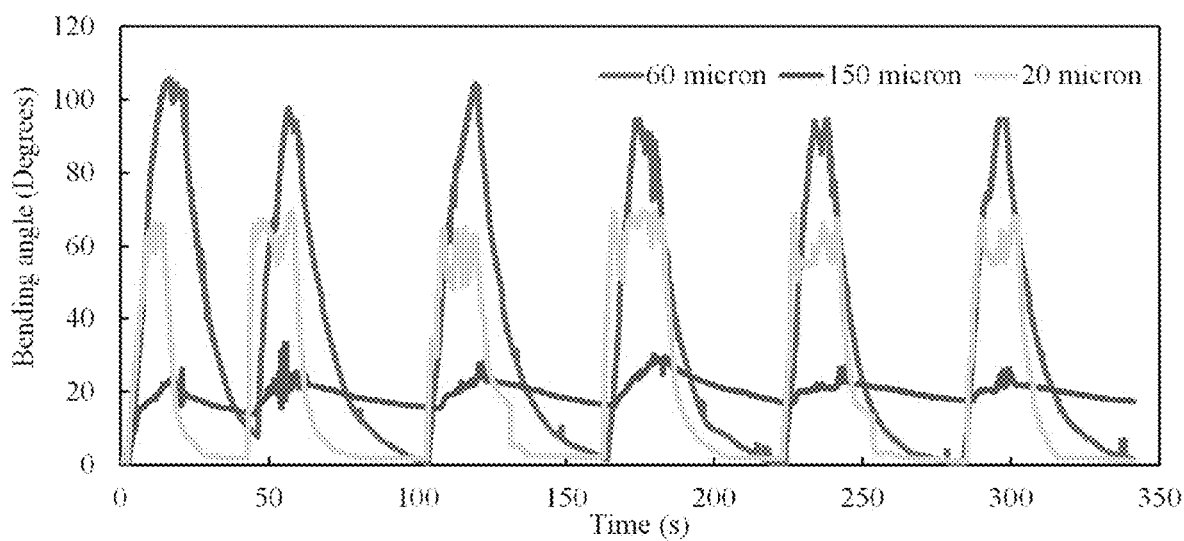
FIG. 4b shows a plot comparing the maximum bending angle of PEG/CA films with thicknesses of 20 µm, 60 µm, and 150 µm.

The humidity cycling process was repeated for multiple times to evaluate the reversibility of the PEG/CA films reacting to humidity change. In FIG. 4a, the 60 μm-thick PEG/CA film can rapidly reach maximum bending angel around 110° within 10 s in each cycle. The almost-full recovery takes between 20 to 40 s. This process is repeatable in different cycles and the there was no decay in the behavior observed. FIG. 4b compared the behavior of films with different thicknesses. For the 20 μm-thick, the behavior is also reversible, while the maximum bending angle is around 70°, and the recovery to 20° takes less than 5 s. The 150 μm-thick PEG/CA film's behavior is reversible too. It's just the maximum bending angle is less than 30°. Therefore, both thin and thick single layer PEG/CA films exhibited excellent reversibility when exposed to the cycling of humidity change. We can choose the thickness of the film depending on how much bending is desired depending on the requirement of the application. For the smart greenhouse humidity regulation purpose, larger bending angles are preferred, which means films thinner than 100 μm are more recommended.

Figure 5A:
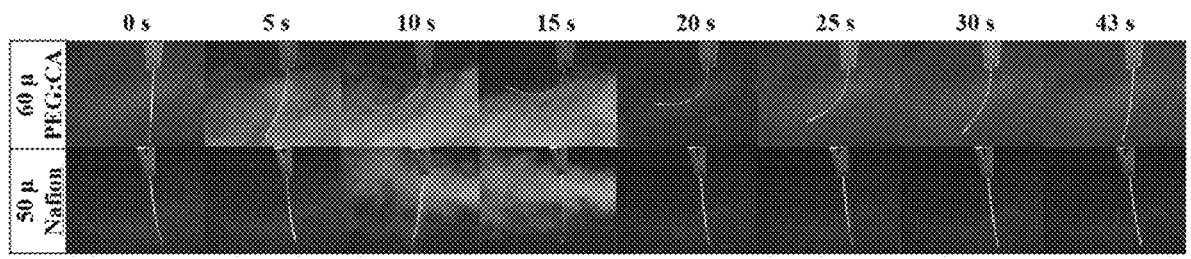
FIG. 5a shows optical images of cyclic humidity induced bending behavior of 60 µm PEG/CA film and 50 µm NAFION film.
Figure 5B:
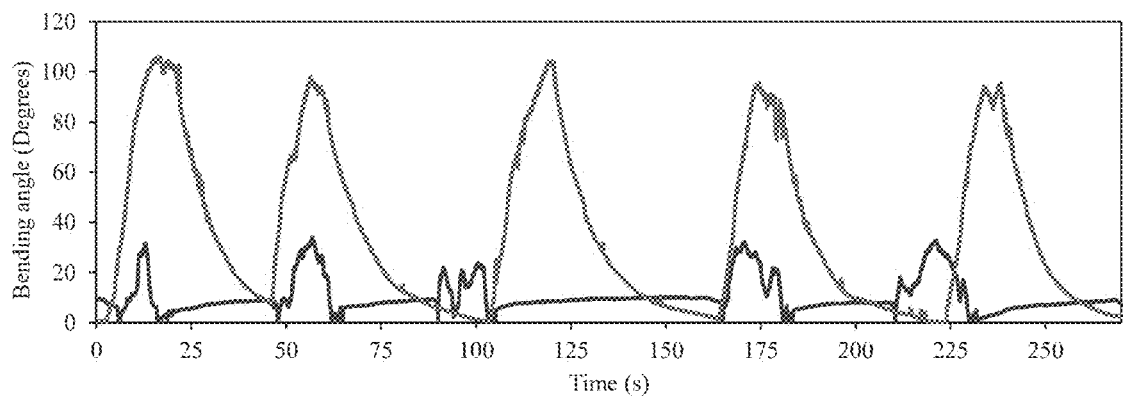
FIG. 5b shows plotted cyclic bending angle results of PEG/CA and NAFION films.

NAFION membranes are well known for their hygroscopic swelling capability. We compared the cyclic humidity induced bending of the conventionally used NAFION films and the newly made PEG/CA film. As plotted in FIG. 5, the bending angle of the PEG/CA film can reach an average maximum bending angle of around 100° for 6 cycles; however, the maximum angle for the NAFION film is as small as ~30°. Thus, it confirms that the PEG/CA film performs much better in being actuated to bend when exposed high humidity. Plus, PEG and CA polymers are both biodegradable and environmentally friendly materials. Therefore, PEG/CA films are better candidates to realize humidity regulation for greenhouses as smart covers compared with NAFION material as a kind of non-degradable sulfonated tetrafluoroethylene-based fluoropolymer-copolymer.

Humidity induced bending behavior of double layer PEG+CA films.

Figure 6A:
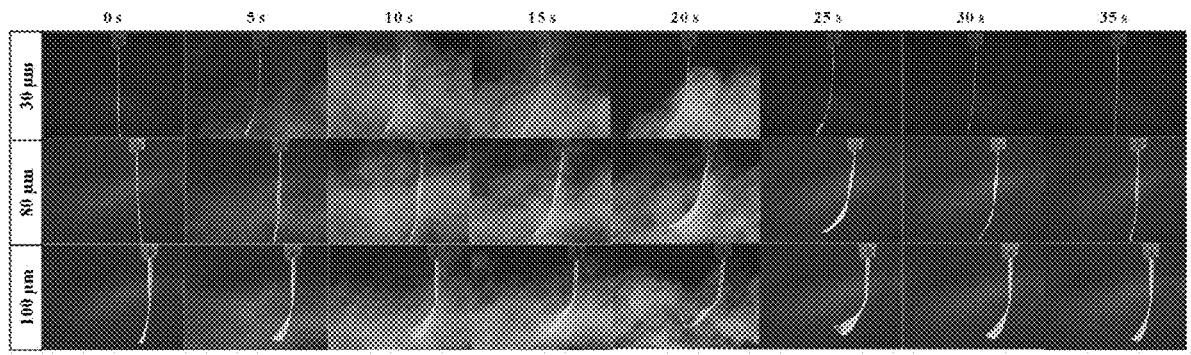
FIG. 6a shows optical images of the maximum bending angle of PEG+CA double layer films with different thicknesses during humidity cycling.
Figure 6B:
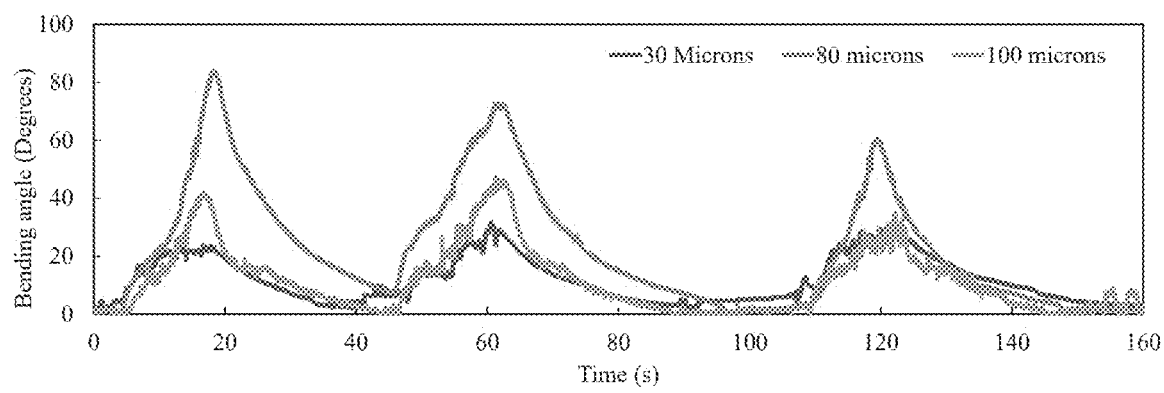
FIG. 6b shows the maximum bending angle change during humidity cycling.

For double layer PEG+CA films, thickness ratio of PET:CA between 1:1 and 1:2 can obtain high quality transparent films, while thickness ratios like 1:3, 1:4, 3:1 and 4:1 end up with whitish and low mechanical properties. Similar as single layer PEG/CA films, double layer PEG+CA films also went through humidity cycling tests. Based on FIG. 6a), the maximum bending angle of 30 μm-thick double layer PEG+CA film is 31°. The bending angle of 80 μm-thick films could rapidly reach as large as 83° within 20 s. With the thickness increased to 100 μm, the maximum bending angle was reduced to 42°, which is about half of the bending angle of 100 μm-thick single layer PEG/CA film. Thus, double layer films are less reactive compared with single layer films.

Humidity Regulation of Greenhouses with PEG/CA Film as the Smart Cover.

Figure 7A:
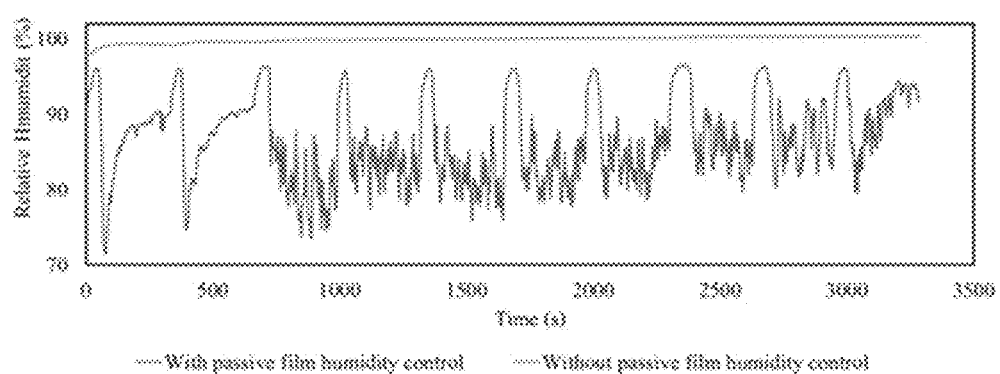
FIG. 7a shows an RH comparison between the area with and without the smart cover during humidity cycling.
Figure 7B:
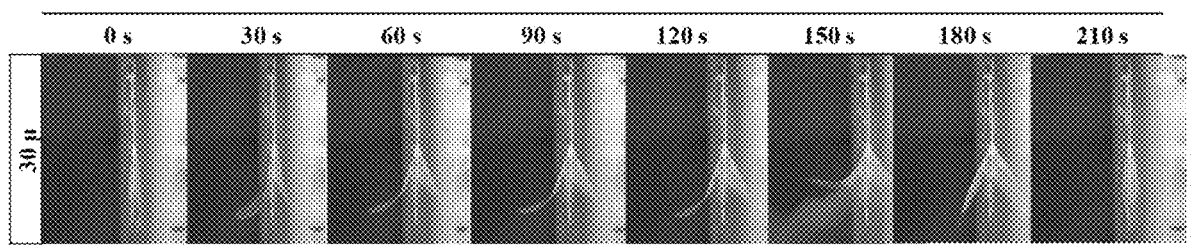
FIG. 7b shows optical images of open and close behavior of the smart cover during once humidity test cycle.

The humidity regulation effect of PEG/CA films for greenhouses was tested by covering the opening of the greenhouse with the PEG/CA film and monitor the humidity change in the greenhouse near it and compare with the area without the smart cover. As shown in FIG. 7, with the humidifier kept on, the RH of the area without the smart cover maintained at ~100%. But for at the area near the opening, the smart cover bends towards the low humidity environmental side once the humidity reaches ~90%. This bending behavior opens the air path to allow the water vapor to escape from greenhouse. The RH went through a very fast drop from higher than 95% to as low as ~75%. With the humidifier turned off, the PEG/CA kept its bending behavior, allowing the water vapor continued to escape until that area reached the similar RH as the external environment. This humidity cycling test was repeated for multiple times. During this humidifying and dehumidifying process, we observed the smart cover opened for 30 s in humidifying process and completely close after just 30 s. This humidity activated opening and closing behavior is repeatable, providing a simple, effective, eco-friendly, and continuous passive humidity regulation method for greenhouses.

Humidity Monitoring with the CEP Printed PEG/CA Humidity Sensor.

Figure 1I:
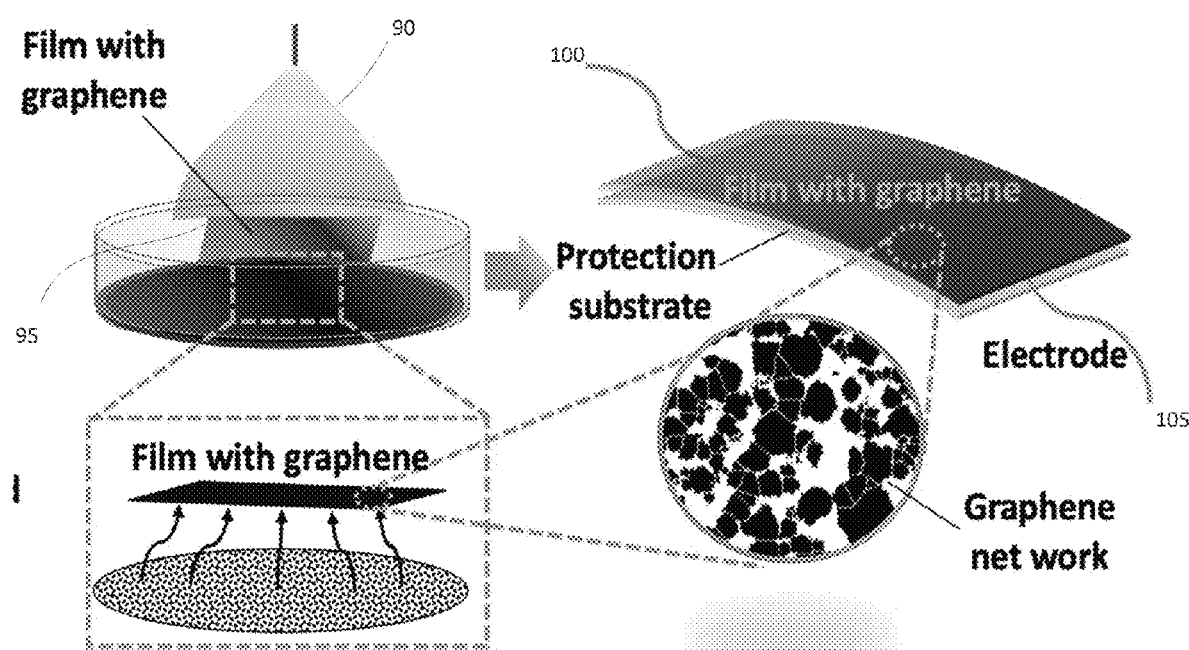
FIG. 1i is a diagrammatic illustration of an exemplary manufacturing process of the CEP printed PEG/CA humidity sensor.

As described in FIG. 1i, we utilized the CEP printing process to coat binder-free graphene powders onto the PEG/CA films. The binder-free network is sensitive to the stress or strain applied on the sensor or the substrate. The resistivity of the graphene network will change when the bending and recovery of the PEG/CA film happens. We can take advantage of this capability to manufacture humidity sensors and utilize them for humidity regulation of greenhouses.

Figure 8:
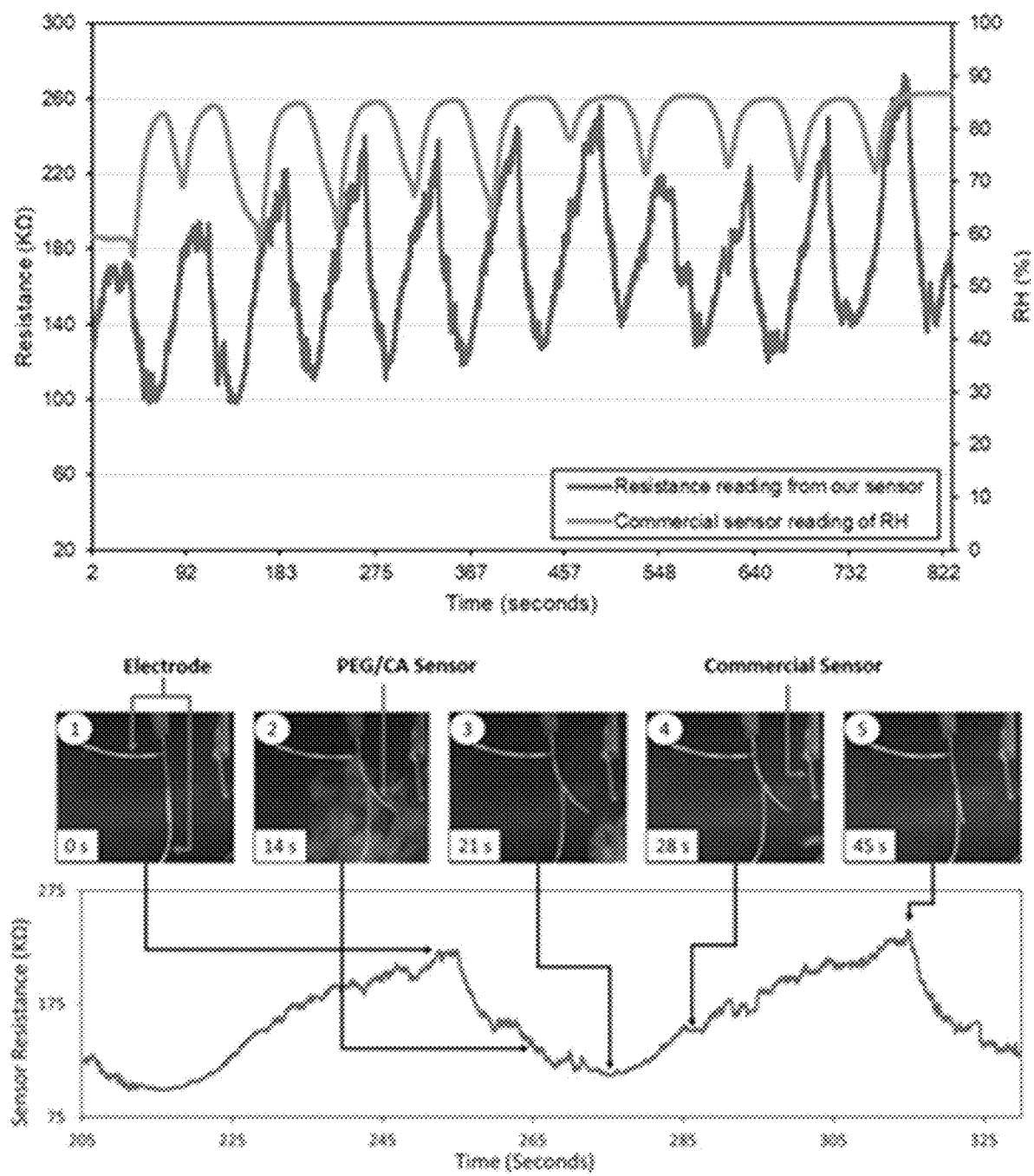
FIG. 8 shows the resistivity change of the CEP printed PEG/CA humidity sensor comparing with the reading of the commercial humidity sensor under cyclic humidity exposure.

FIG. 8a is the cyclic humidity monitoring by comparing the reading from the commercial SENSIRION humidity sensor and the CEP printed PEG/CA sensor. In the first cycle (FIG. 8b), the resistivity of the PEG/CA sensor reduced while the humidity increases. Its reaction is even faster than the commercial sensor. After the humidity is turned off, the humidity reading drops down, and the resistivity of the sensor increases. When the second cycle started, the resistivity of the PEG/CA was consistent before the measured humidity reach ~80%, which falls in the same range when greenhouses require practices to reduce the humidity. Then the resistivity decreased rapidly because of the bending behavior of the PEG/CA smart substrate. After the humidity reduces back to ~80%, the resistivity increases back again. This process was repeated as plotted in FIG. 8a, with good reversibility and cyclic ability. It means that the CEP printed PEG/CA sensor can be utilized for humidity monitoring. Compared to commercial humidity sensor, it is more sensitive when the humidity is higher than ~80%, which is suitable for greenhouse humidity regulation. And its reaction is even faster than one of the best humidity sensors on the market.

Active Humidity Regulation by Controlling the Ventilation Fan with PEG/CA Humidity Sensor.

Figure 9:
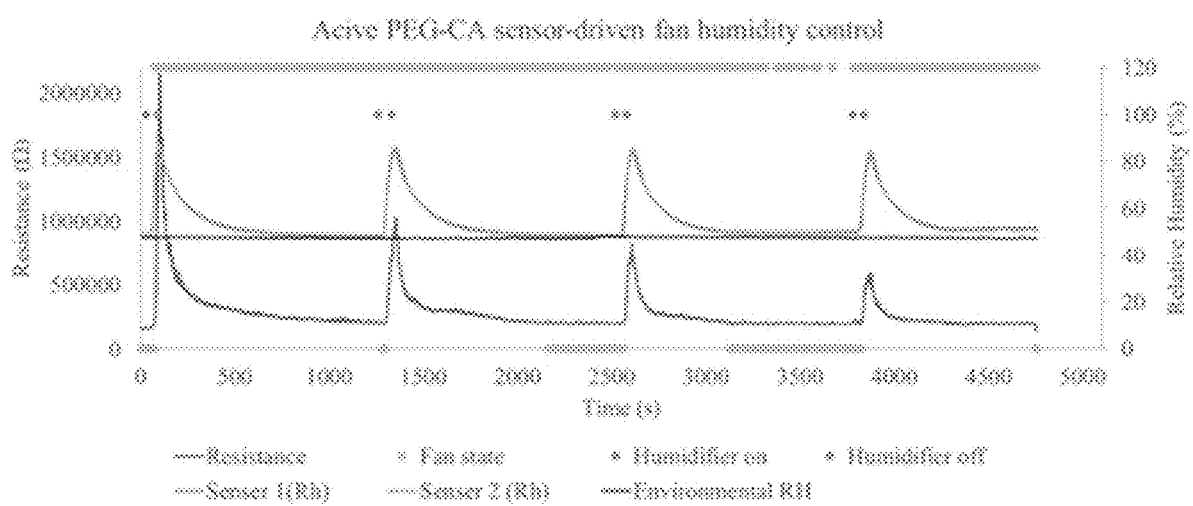
FIG. 9 shows a plot of the humidity regulation effect of using the CEP printed PEG/CA humidity sensor to actively control the ventilation fan in the greenhouse.

The PEG/CA humidity sensor can also be used to actively regulate the humidity in the greenhouse through controlling the ventilation fan to accelerate the air circulation and humidity release in the greenhouse. To better match with the humidity change, different with the sensor in FIG. 8, the PEG/CA sensor was pre-designed to possess an angle about 30° towards the high humidity side before using, meaning it is at a lower value status before using. With the humidity increases, instead of bending, the sensor straightened back to 0° and hence shows higher resistance. FIG. 9 shows that the change of the resistance of the CEP printed PEG/CA humidity sensor matches very well with the commercial sensor measured humidity inside the greenhouse. As the resistance increased to the pre-set threshold, it triggers the controller to turn on the fan to blow out the water vapor through the opening. This actively controlled process can quickly reduce the humidity in the greenhouse the humidity. Plus, this process is repeatable, as the shape of the sensor can quickly recover back to the initial 30° status with lower resistance. With this active regulation method, humidity in the green house can be controlled in a more efficient way.

Bending Mechanism of the PEG/CA Film.

Figure 10A:
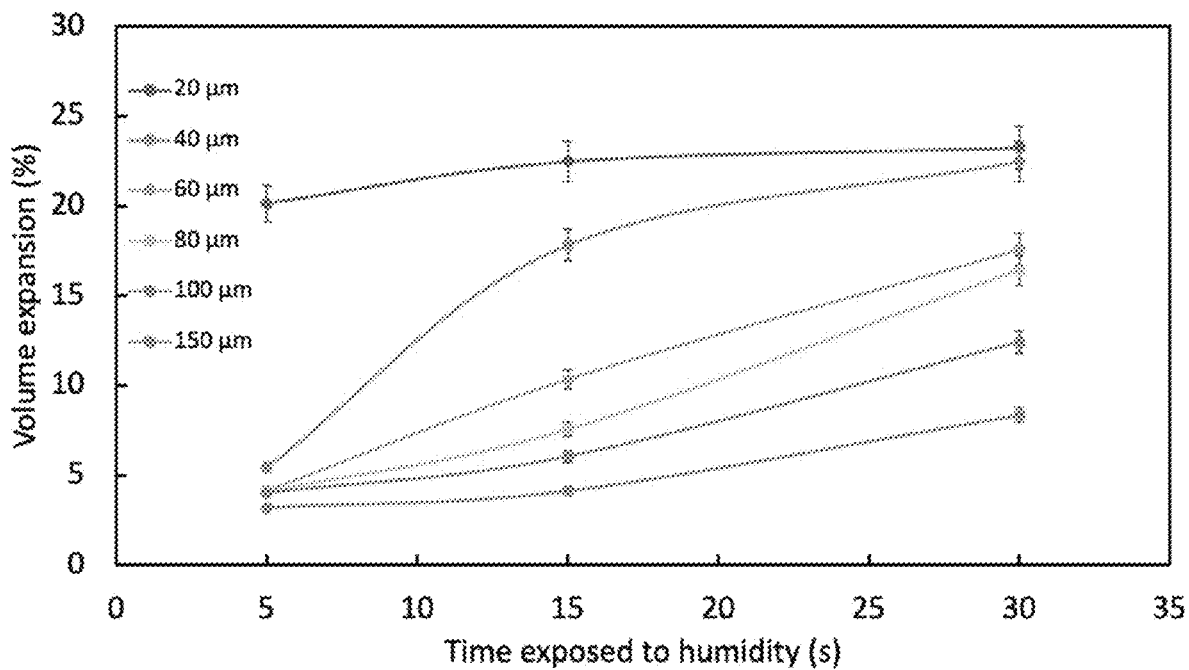
FIG. 10a shows a plot of volume expansion of PEG/CA films with different thicknesses when fully immersed in water for 5 s, 15 s, and 30 s.

The bending behavior of the PEG/CA film when exposed to humidity is caused by its hygroscopic expansion capability. When one side of the film was exposed to high humidity, the length on that side will increase because of hygroscopic expansion, then it causes internal strain in the film and bending of the film towards the low humidity side. We quantified the hygroscopic expansion behavior of PEG/CA film. FIG. 10a summarizes the hygroscopic expansion behavior of PEG/CA films with different thicknesses after fully immersed in water for 5 s, 15 s, and 30 s. It is obvious that when the immersed time increases, the volume expansion increases with it. But for films thinner than 60 μm, the increase rate from 5 s to 15 s is faster than that from 15 s to 30 s. It indicates that the PEG/CA films can swell very quickly, the thinner the faster they are to get fully saturated. For films thicker than 60 μm, the hygroscopic expansion rate within the first 30 s is almost consistent. This discovery confirms the fast reaction capability of PEG/CA to high humidity.

On the other aspect, the volume expansion ratio for thinner films is larger than thick films. For 20 μm-thick films, the volume expansion can reach as high as 23.25% after 30 s; while for 150 μm films, the expansion only reached 8.37%. This is a good explanation of the larger bending angles for thinner films. Another aspect which also need taken into consideration of the rigidness of the films with different thicknesses. Therefore, to better explain the bending behavior, we conducted COMSOL simulation on PEG/CA films with different thicknesses. The simulated results align with our experimental results.

COMSOL simulation was utilized to model the bending characteristics of the PEG/CA films. Using psychrometric data of the water vapor and lab environment in conjunction with the maximum angle of deflection at the midpoint of specimen (as measured by the MATLAB algorithm) we estimate a coefficient of hygroscopic swelling B. Based on FIG. 10b, β is 0.142±0.025 kg/m$^3$ at a 95% confidence interval, which is enough to significantly reduce the amount of perceivable deflection about the X axis. As the COMSOL model assumes near perfect rotation about the X axis the reduction to the deflection significantly alters the estimated 8. Additionally, the relationship between β and the rotation of any fixed point along the length of the simulated specimen was found to be perfectly linear. FIG. 10c angular deflection, first principal strain, and Von Mises stress distribution when the 60 μm-thick PEG/CA specimen was exposed to 80% RH. It matches well with the experimental result.

Figure 10B:
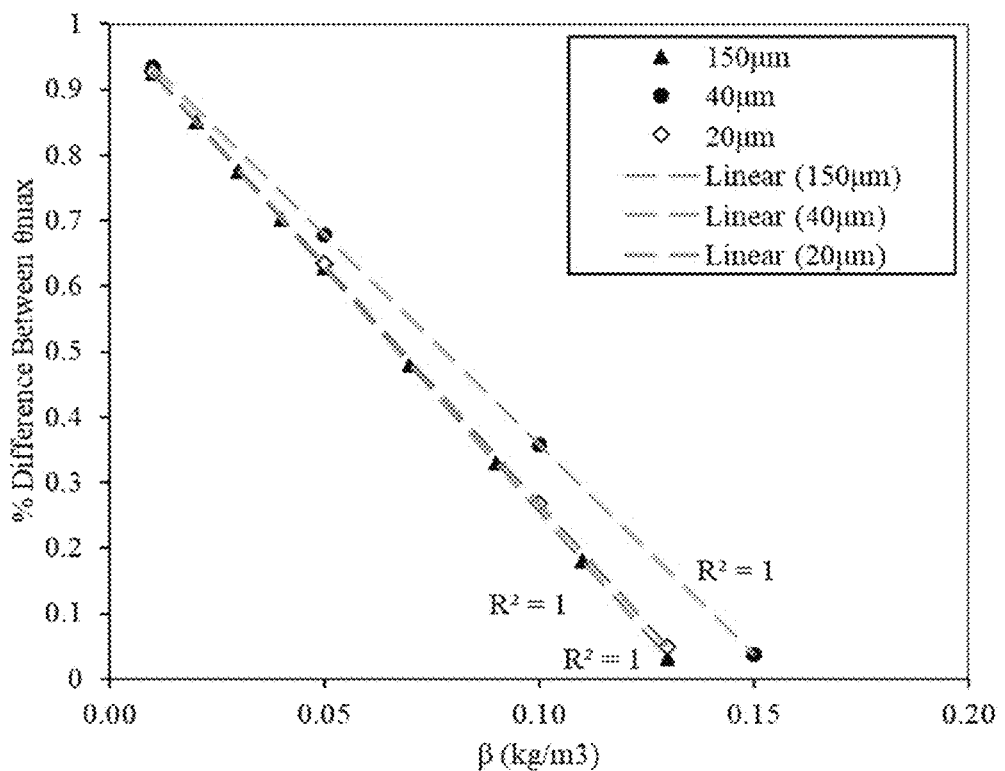
FIG. 10b is a β Estimate Plot (the data in the above figure results in an estimate of β=0.142±0.025 kg/m3 in a 95% confidence interval).
Figure 10C:
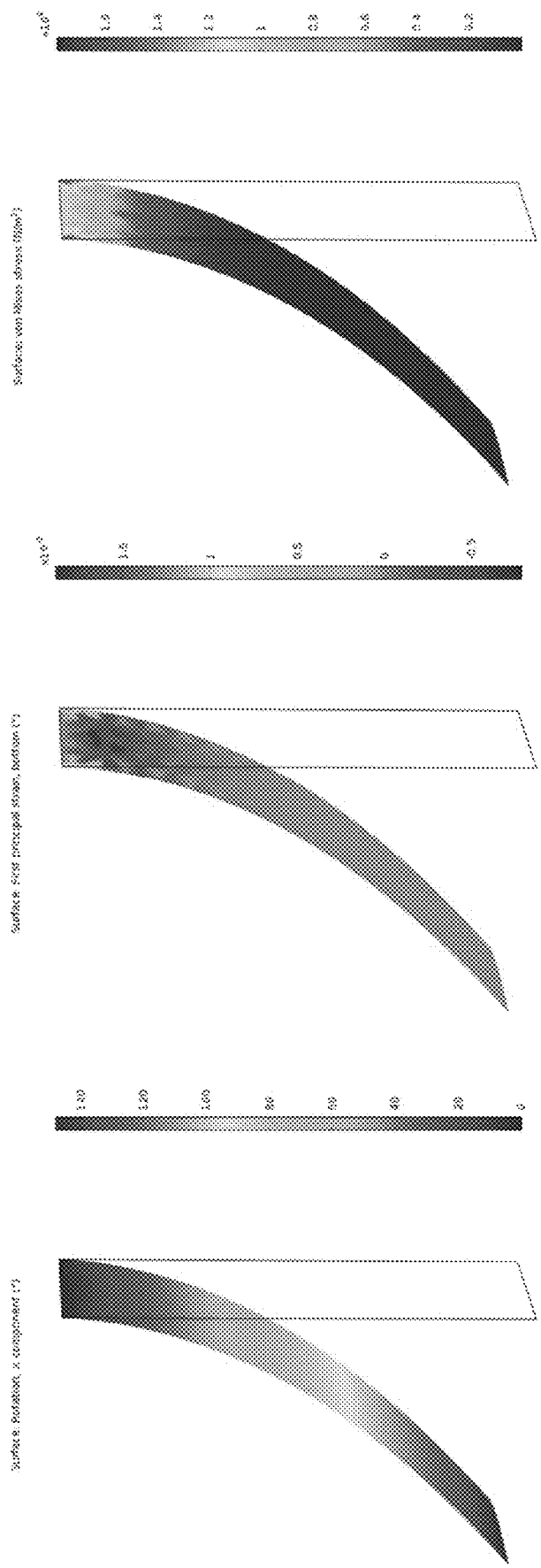
FIG. 10c shows simulated angular deflection, first principal strain, and von mises stress of 60 µm-thick PEG/CA specimen exposed to 80% RH.

FIG. 10 shows the bending of PEG/CA films caused by their hygroscopic expansion behavior where FIG. 10a is the volume expansion of PEG/CA films with different thicknesses when fully immersed in water for 5 s, 15 s, and 30 s; FIG. 10b is the β Estimate Plot (the data in the above figure results in an estimate of =0.142±0.025 kg/m$^3$ in a 95% confidence interval); and FIG. 10c is the simulated angular deflection, first principal strain, and von mises stress of 60 μm-thick PEG/CA specimen exposed to 80% RH.

Resistivity Change Mechanism of the CEP Printed PEG/CA Humidity Sensor.

The resistance change of the CEP printed PEG/CA humidity sensor was caused by the microstructure change of the binder-free graphene network when the shape of the PEG/CA substrate changes because of the hygroscopic swelling and bending behavior. To assist in the analysis of the mechanical characteristics of the graphene networks fabricated by the CEP technique, we adopted and customized an algorithm for generating computational material models from microscopic images based on an open-source MATLAB algorithm. The algorithm starts with using image filtering techniques to generate a binary image from the body of the material and the voids between particles. The binary image is then processed by the vectorization function, which defines the geometric information stored in the DXF files, which can be used as a material model for FE simulations.

Figure 11:
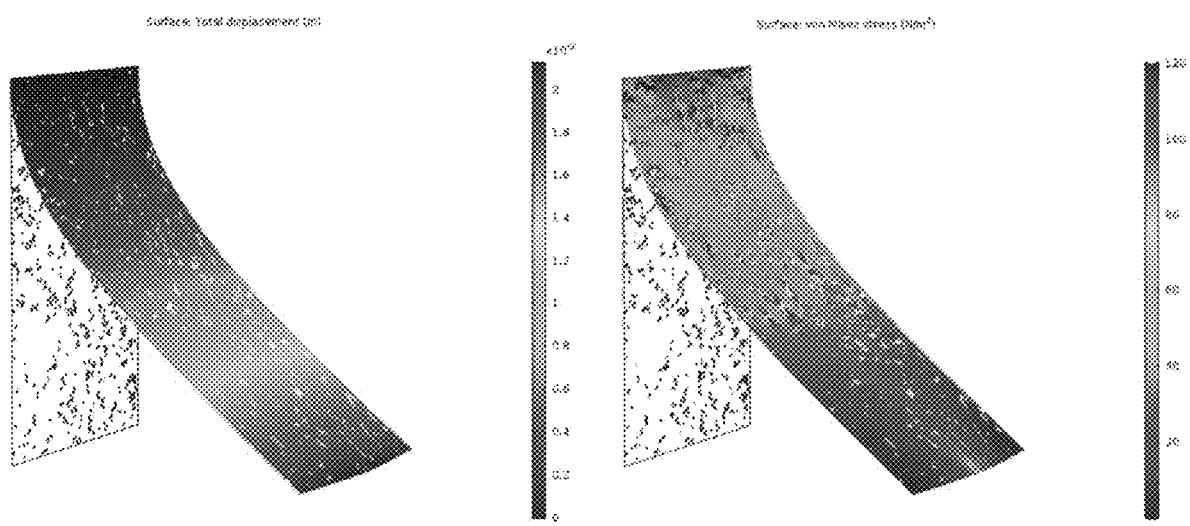
FIG. 11 shows a computer-generated analysis of displacement and von Misses Stress results of test DXF simulation.
Figure 12:
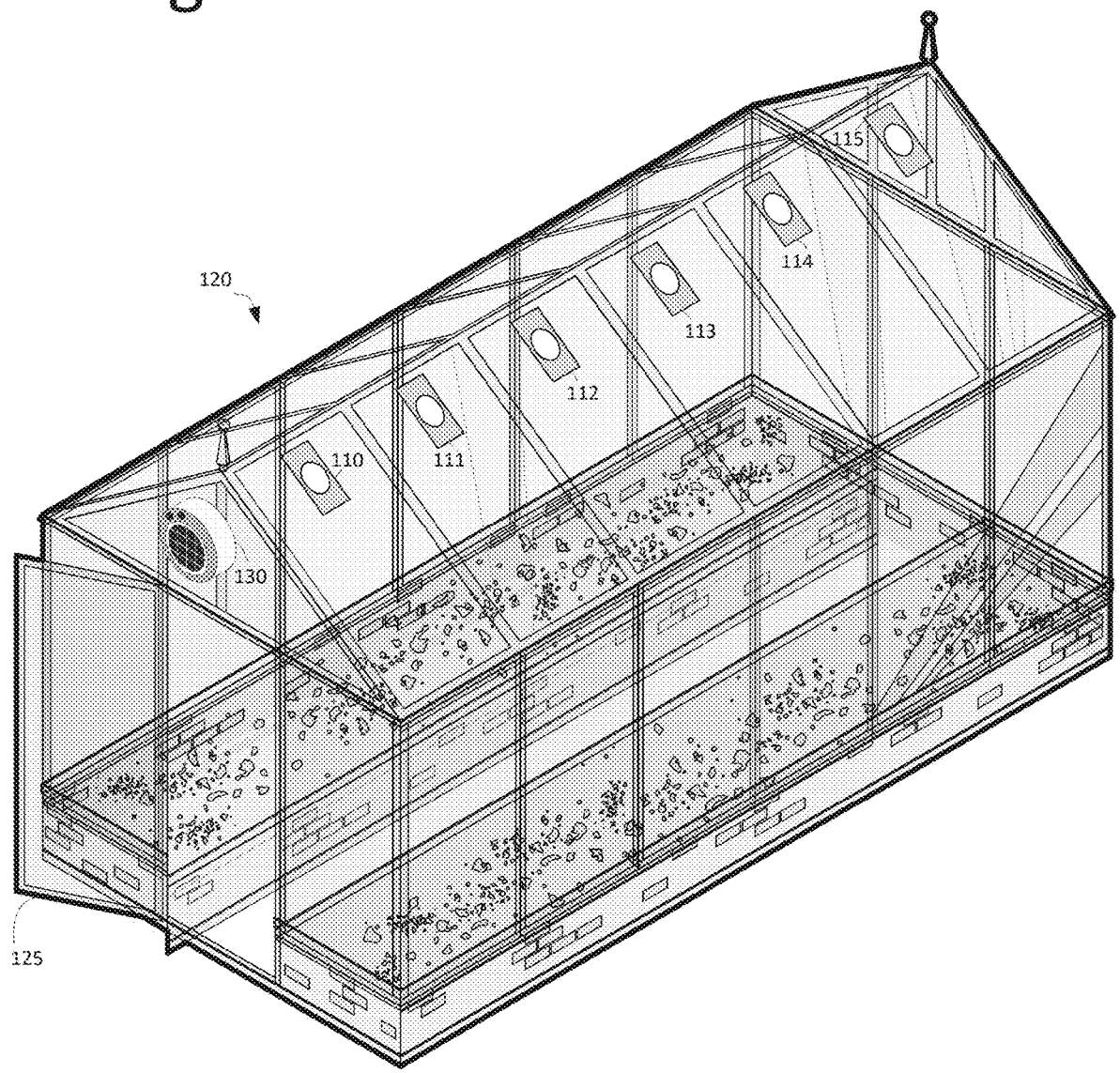
FIG. 12 is an elevated, isometric view of a greenhouse implementing embodiments of the invention with a plurality of smart vents and sensors.

The material model was imported to COMSOL software to simulate the bending behavior of the graphene network using the MATLAB DXF output corresponding to the 3.5 cm-long sample. Using the plate physics module, the model was assigned dimensions of 130 mm by 190 mm by 10 μm. To mimic the bending motions that the graphene network underwent when subjected to substrate bending, we fixed leftmost edge of the model in place and remaining geometry was left free of constraints. The model was then deformed using a point load of 10 nano-newtons placed at its rightmost edge. The resulting deformation and von Misses stress distributions are shown in FIG. 11. It can be observed that stress concentrations were induced at the voids of the graphene network due to its heterogeneous microstructure. Furthermore, the bending characteristics of this model match what is expected of the model. FIG. 12 shows a conceptual embodiment of the invention in practice with a plurality of ventilation ports 110-115 integral to the top of greenhouse 120. Humidity control fan 130 and door 125 were the previous means of ventilating the interior of greenhouse 120 to modulate RH. It is further anticipated that the sensor system described above may be used to control fan 130 alone or in conjunction with ventilation ports 110-115.

Glossary of Claim Terms

Cellulose acetate (CA) is a synthetic plastic polymer that is derived from cellulose, a natural polymer that is the main component of plant cell walls. Cellulose acetate is produced by the reaction of cellulose with acetic anhydride, which results in the acetylation of the cellulose molecules.

Graphene is a single layer of carbon atoms arranged in a hexagonal lattice pattern. It is considered a two-dimensional (2D) material and is considered the building block for other carbon-based materials, such as graphite, carbon nanotubes, and fullerenes.

Greenhouse means a building or structure, usually made of transparent material such as glass or plastic, in which plants are grown and protected from external environmental conditions, such as wind, cold, and excessive heat or light. The interior of a greenhouse is maintained at a temperature and humidity level that is suitable for the growth and cultivation of plants. The main purpose of a greenhouse is to provide a controlled environment for plant growth, which allows for year-round cultivation, plant research, and the protection of delicate or rare plant species. Greenhouses can also be used for commercial production of crops, such as vegetables, flowers, and ornamental plants.

Hygroscopic expansion means the phenomenon where a material increases in size or volume as it absorbs moisture from the air. This expansion is caused by the interaction between the material and the water molecules in the air. The amount of expansion can vary depending on the material, the humidity level, and the temperature.

NAFION is a brand name for a type of ion-conducting membrane made from a perfluorosulfonic acid polymer. NAFION films are used in a variety of applications, including fuel cells, batteries, and electrolyzers.

Piezoresistive materials are materials that exhibit a change in electrical resistance and capacitance when subjected to mechanical stress or strain (e.g., deformation). This property is used in various sensors and actuators, such as pressure sensors, strain gauges, and force sensors, to convert mechanical deformation into an electrical signal that can be measured and processed. Some common piezoresistive materials include silicon, polymers, quartz, tourmaline, various ceramics, such as lead zirconate titanate (PZT) and various composite materials. As used in this specification piezoelectric materials mean a smart material that can change its electrical properties based on their mechanical state.

Polyethylene glycol (PEG) is a synthetic polymer that is used in a variety of applications, including pharmaceuticals, cosmetics, and industrial products. PEG is a polyether compound that is produced by polymerizing ethylene oxide and is used in many products because of its non-toxic, non-irritating, and non-allergenic properties.

Polyurethane (PU) adhesive films are thin sheets of polyurethane material that have an adhesive backing.

Relative humidity (RH) means the measure of the amount of moisture in the air, expressed as a percentage of the maximum amount of moisture the air can hold at a given temperature. It is the ratio of the partial pressure of water vapor in the air to the saturation vapor pressure of water at the same temperature.

Von Mises stress, also known as the von Mises criterion, is a measure of the overall stress in a material that is subjected to complex stress states. It is used to determine the yield strength of materials in plastic deformation and is widely used in the fields of engineering and materials science.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A ventilation port for maintaining a humidity range within a sealed or partially sealed enclosure maintaining a level of atmospheric moisture comprising a polymer blend film of a hydrophilic first component and a substrate second component, the first component serving as the water-absorbing material and the second component serving as the mechanical backbone, wherein upon a present humidity within the enclosure exceeds a predetermined level outside the humidity range, the polymer blend film bends to open the port and vent excess humidity from the enclosure until the humidity falls back within the humidity range, causing the polymer blend film to return to its original state and close the port.

2. The ventilation port of claim 1 wherein the polymer blend film is constructed of a thickness between 40 and 100 μm.

3. The ventilation port of claim 1 wherein the polymer blend film is constructed of a thickness between 10 and 2,000 μm.

4. The ventilation port of claim 1 wherein the ratio of the first component to the second component is less than or equal to 20 percent of the total weight of the film.

5. The ventilation port of claim 1 wherein the first component is selected from the group consisting of polyethylene glycol (PEG), polyvinyl alcohol (PVA), starch, cellulose, poly acrylic acid, polyacrylonitrile and poly(N-isopropylacrylamide) (PNIPAM).

6. The ventilation port of claim 1 wherein the second component is selected from the group consisting of cellulose acetate (CA), polyimide, polystyrene, poly(methyl methacrylate) (PMMA) and polycarbonate.

7. The ventilation port of claim 1 wherein the first component is PEG and the second component is CA.

8. A ventilation port for maintaining a humidity range within a greenhouse comprising a polymer blend film constructed of a thickness between 40 and 100 μm of polyethylene glycol (PEG) and cellulose acetate (CA), the PEG serving as the water-absorbing material and the CA serving as the mechanical backbone, wherein the ratio of PEG to CA is less than or equal to 20 percent of the total weight of the film, and upon a present humidity within the greenhouse exceeds a predetermined level outside the humidity range, the polymer blend film bends to open the port and vent excess humidity until the humidity falls back within the humidity range, causing the polymer blend film to return to its original state and close the port.

9. A humidity sensor comprising:
a polymer blend film of a hydrophilic component and a substrate component;
a layer of piezoresistive material deposited onto the polymer blend film;
a set of electrodes in galvanic communication with the layer of piezoresistive material; and
an electrical device retrieving a resistivity or capacitance measurement as the layer of piezoresistive material undergoes mechanical bending of the polymer blend film responsive to changes in humidity whereby the resistivity or capacitance measurement is correlated to a humidity value reported by the sensor.

10. The humidity sensor of claim 9 wherein the polymer blend film has a first side exposed to humidity sought to be measured and a second side coated with a substantially vapor resistant protection layer.

11. The humidity sensor of claim 10 wherein substantially vapor resistant protection layer is approximately 1-500 μm-thick.

12. The humidity sensor of claim 9 wherein the piezoresistive material is selected from the group consisting of graphene, carbon nanotubes, metal nanowires, nanoparticles, graphite, and liquid metal.

13. The humidity sensor of claim 9 wherein the piezoresistive material is binder-free graphene.

14. The humidity sensor of claim 9 wherein the polymer blend film is pre-deformed to an angle greater than zero degrees whereby as humidity increases the polymer blend film straightens towards an angle of zero degrees thereby changing strain-dependent resistivity or capacitance in the layer of piezoresistive material and thus change the measurement retrieved by the electrical device.

15. The humidity sensor of claim 9 further comprising a humidity threshold and a corresponding resistivity or capacitance threshold whereby upon an ambient humidity value within a vapor retaining enclosure causes the polymer blend film deformation to change the resistivity or capacitance measurement to exceed the threshold, a controller in electrical communication with the electrical device activates an exhaust mechanism to exhaust humidity from the vapor retaining enclosure until such time that the resistivity or capacitance measurement falls under the threshold wherein the exhaust mechanism is deactivated.

16. The humidity sensor of claim 9 further comprising a humidity range and a corresponding resistivity or capacitance range whereby upon an ambient humidity value within a vapor retaining enclosure causes the polymer blend film deformation to change the resistivity or capacitance measurement, a controller in electrical communication with the electrical device increases an exhaust mechanism throughput to exhaust additional humidity from the vapor retaining enclosure and upon an ambient humidity value within a vapor retaining enclosure causes the polymer blend film deformation to change the resistivity or capacitance measurement, a controller in electrical communication with the electrical device decreases an exhaust mechanism's throughput to reduce the rate in which additional humidity is exhausted from the vapor retaining enclosure.

17. The humidity sensor of claim 9 wherein the first component is selected from the group consisting of PEG, PVA, starch, cellulose, poly acrylic acid, and polyacrylonitrile, and PNIPAM.

18. The humidity sensor of claim 9 wherein the second component is selected from the group consisting of CA, polyimide, polystyrene, PMMA and polycarbonate.

19. The humidity sensor of claim 9 wherein the first component is PEG and the second component is CA.

* * * * *